United States Patent
Numoto

(10) Patent No.: US 8,459,692 B2
(45) Date of Patent: Jun. 11, 2013

(54) GAS GENERATOR AND METHOD FOR ASSEMBLING SAME

(75) Inventor: Kenji Numoto, Hyogo (JP)

(73) Assignee: Daicel Chemical Industries, Ltd., Osaka-Shi (JP)

( * ) Notice: Subject to any disclaimer, the term of this patent is extended or adjusted under 35 U.S.C. 154(b) by 117 days.

(21) Appl. No.: 13/081,723

(22) Filed: Apr. 7, 2011

(65) Prior Publication Data

US 2011/0248486 A1     Oct. 13, 2011

Related U.S. Application Data

(60) Provisional application No. 61/323,687, filed on Apr. 13, 2010.

(30) Foreign Application Priority Data

Apr. 8, 2010    (JP) .................................. 2010-89460

(51) Int. Cl.
    *B60R 21/26*        (2011.01)

(52) U.S. Cl.
    USPC ............................ 280/736; 280/741; 102/530

(58) Field of Classification Search
    USPC ........................... 280/736, 741; 102/530, 531
    See application file for complete search history.

(56) References Cited

U.S. PATENT DOCUMENTS

| | | | | |
|---|---|---|---|---|
| 6,095,561 | A * | 8/2000 | Siddiqui et al. ................ | 280/742 |
| 6,485,051 | B1 * | 11/2002 | Taguchi et al. ................ | 280/736 |
| 7,240,916 | B2 * | 7/2007 | Bierwirth et al. ............. | 280/736 |
| 7,343,862 | B2 * | 3/2008 | McCormick .................. | 102/530 |
| 7,637,535 | B2 * | 12/2009 | Gotoh et al. .................. | 280/741 |
| 2005/0194772 | A1 * | 9/2005 | Numoto et al. ............... | 280/741 |
| 2006/0005734 | A1 * | 1/2006 | McCormick .................. | 102/530 |
| 2008/0284146 | A1 * | 11/2008 | Hirooka et al. ............... | 280/736 |
| 2009/0121464 | A1 * | 5/2009 | Numoto et al. ............... | 280/741 |

FOREIGN PATENT DOCUMENTS

| | | |
|---|---|---|
| EP | 1090817 A1 | 4/2001 |
| EP | 2058183 A2 | 5/2009 |
| JP | 2000-225914 A | 8/2000 |

OTHER PUBLICATIONS

International Search Report and Written Opinion of the International Searching Authority for International Application No. PCT/JP2011/057507, mailed Jul. 20, 2011.

* cited by examiner

*Primary Examiner* — Faye M Fleming
*Assistant Examiner* — James English
(74) *Attorney, Agent, or Firm* — Birch, Stewart, Kolasch & Birch, LLP

(57) ABSTRACT

The present application provides a gas generator including: a cylindrical housing with a gas discharge port, one end of the tubular housing being closed by a closing member including a disk-shaped main body portion, an annular projection portion and the peripheral surface of the annular projection portion, a transfer charge chamber housing defining a transfer charge chamber charged with a transfer charge and being attached to the closing member, the transfer charge chamber housing having a cup-like shape including a flame-transferring hole at a bottom surface, a flange portion and a annular wall surface extending in the axial direction of the housing from the flange portion, being mounted such that the annular wall surface thereof is fitted into an annular groove, and being fixed by the flange portion pressed in the axial direction by a supporting member and a sealing member disposed in a remaining space of the annular groove and sealing between the tubular housing and the closing member.

13 Claims, 5 Drawing Sheets

GAS GENERATOR AND METHOD FOR ASSEMBLING SAME

This nonprovisional application claims priority under 35 U.S.C. §119(a) to Patent Application No. 2010-89460 filed in Japan on 8 Apr. 2010 and 35 U.S.C. §119(e) to U.S. Provisional Application No. 61/323,687 filed on 13 Apr. 2010, both of which are incorporated by reference.

BACKGROUND OF THE INVENTION

1. Field of the Invention

The present invention relates to a gas generator for use in a restraining apparatus such as an airbag system installed in a vehicle and used as a restraining device, as well as to a method for assembling such a gas generator.

2. Description of the Related Art

An airbag system is known as a restraining apparatus installed in a vehicle. As this type of airbag system, there are known a pyrotechnic gas generator that combusts a solid gas generating agent to supply gas for inflating an airbag, a stored-type gas generator that uses pressurized gas, and a hybrid-type gas generator that uses both the pressurized gas and the solid gas generating agent.

Gas generators are disposed in various places in a vehicle. Of these gas generators, the one used in a passenger-side airbag system or side-impact airbag system has a cylindrical housing.

The pyrotechnic gas generator including a cylindrical housing has an ignition device disposed at one end thereof. The ignition device ignites and combusts a solid gas generating agent charged inside the housing. However, this ignition device needs to be devised to ignite and combust the solid gas generating agent more efficiently because the amount of solid gas generating agent is relatively greater than that of a driver-side gas generator.

JP-A No. 2000-225914 (in FIG. 1) discloses a gas generator Y having an elongated housing, wherein lid members 8 having igniters 5, 6 fixed thereto are attached to both ends of the housing 1. The igniters 5, 6 are each formed of an ignition tool 14 and transfer charge agent 15. The transfer charge agent 15 is stored in a flanged cap 17, which is fixed to each lid member 8. The flanged cap 17 has a through-hole 17*b* formed on the side where a gas generating agent 4 exists, and a flange portion 17*c* is held between a filter member 3 and each lid member 8.

The flange portion 17*c* is formed in the shape of an annular plate, and abuts against a sealing member 18 that is fitted in a groove formed on a combustion chamber-side edge of each lid member 8, so as to seal the inside of the housing 1.

SUMMARY OF THE INVENTION

The present invention provides, a gas generator including:
a cylindrical housing having both ends closed, a gas discharge port in a peripheral surface thereof and a combustion chamber charged with a gas generating agent therein,
one end of the tubular housing being closed by a closing member having an igniter fixed thereto,
the closing member including a disk-shaped main body portion, an annular projection portion formed in a peripheral surface at one side of the main body portion, and the peripheral surface of the annular projection portion abutting against the inner peripheral surface of the tubular housing,
a transfer charge chamber housing defining a transfer charge chamber charged with a transfer charge,
the transfer charge chamber housing attached to the closing member so as to surround the igniter,
the transfer charge chamber housing having a cup-like shape including a peripheral surface and a bottom surface formed with a flame-transferring hole, and including a flange portion formed at an opening portion thereof and a annular wall surface extending in the axial direction of the housing from the flange portion,
the transfer charge chamber housing being mounted such that the annular wall surface thereof is fitted into a part of an annular groove defined by the tubular housing, the main body and the annular projection portion of the closing member, and the flange portion abuts against the surface of the main body,
the transfer charge chamber housing being fixed by the flange portion pressed in the axial direction by a supporting member inside the tubular housing, and a sealing member being disposed in a remaining space of the annular groove and sealing between the tubular housing and the closing member.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF THE INVENTION

Figure 1:
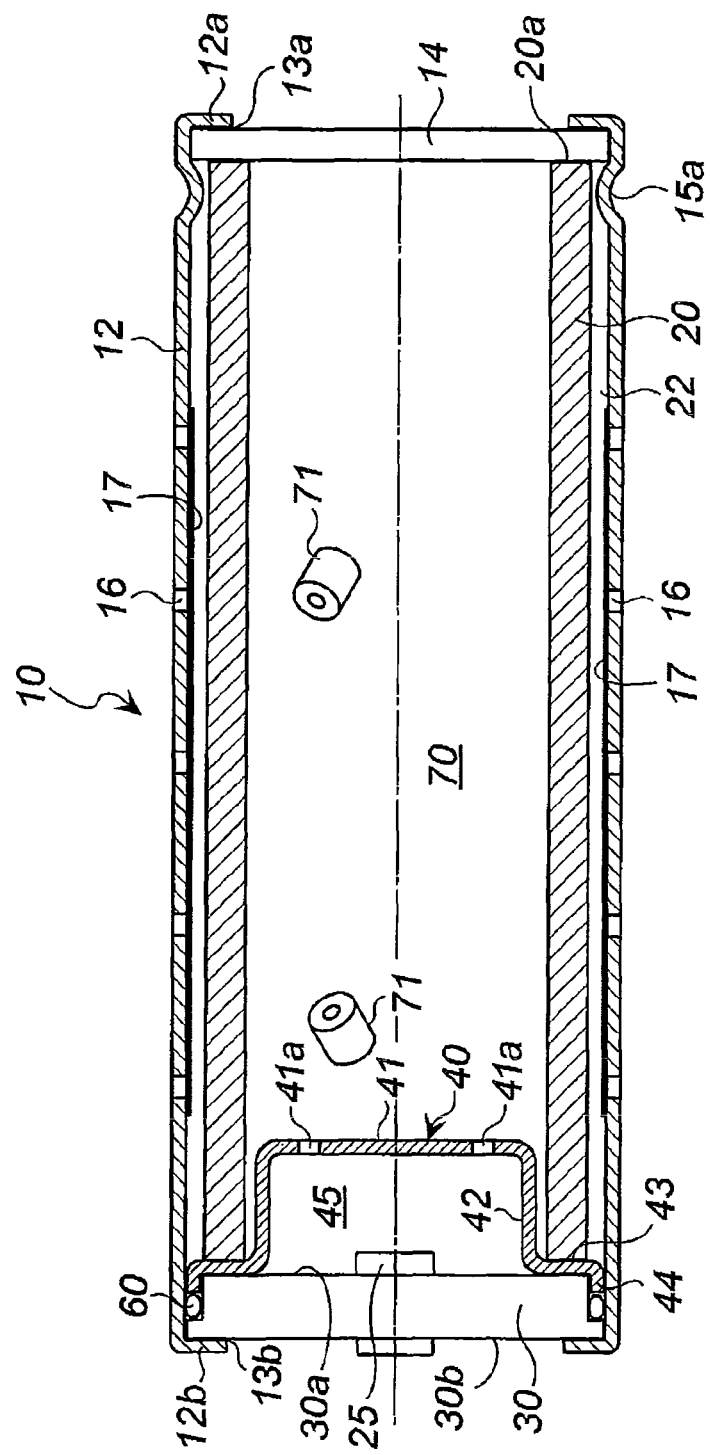
FIG. 1 shows an axial sectional view of a gas generator of the present invention.

According to the structure shown in FIG. 1 of JP-A No. 2000-225914, a central part (the projection side 17*a*) is apt to deform toward the combustion chamber due to the pressure generated when the igniters 5, 6 are ignited and the transfer charge agent 15 is burnt. This deformation pulls the flange portion 17*c* toward the central part. Therefore, even with the sealing member 18, a gap is generated between the flange 17*c* and each lid member 8, causing a short-passing of combustion products produced by the transfer charge agent 15. This situation is considered to lead to an inability of the gas generator Y to maintain the designed actuation performance. From the perspective of the occupants, this gas generator has room for improvement.

The present invention provides a gas generator including a cylindrical housing, and a method for assembling the gas generator, the gas generator being capable of enhancing fixation strength and sealability of a transfer charge chamber, and maintaining the designed actuation performance.

In the gas generator of the present invention, the sealability of the transfer charge chamber prior to and upon the activation is enhanced by a combination of the closing member, members for attaching the transfer charge chamber housing and members for fixing the transfer charge chamber housing the supporting member.

In the gas generator Y of JP-A No. 2000-225914, the flanged cap 17 filled with the transfer charge is apt to deform due to pressure and impact caused upon activation of the gas generator Y (especially the bottom surface of the flanged cap 17 deforms toward the combustion chamber). Consequently, a gap is formed between the flanged cap 17 and the closing member (each lid member 8). This is the cause of the short-passing of the combustion products (flames, high-temperature combustion gas, etc.) produced by the transfer charge, and hence the deterioration of the ignition performance of the gas generating agent.

The gas generator of the present invention, on the other hand, uses a combination of the transfer charge chamber housing and the closing member. Therefore, the transfer charge chamber housing deforms in a way that the annular wall surface comes into further contact with the closing member. For this reason, the gap causing the short-passing is not generated easily, and the ignition performance of the gas generating agent can be maintained.

In the gas generator Y shown in FIG. 1 of JP-A No. 2000-225914, the groove needs to be formed by cutting and processing each lid member 8 to fit the sealing member 18 therein, increasing the processing cost.

In the gas generator of the present invention, on the other hand, the annular groove for disposing the sealing member therein is formed by the combination of the closing member, transfer charge chamber housing, and tubular housing. Thus, it is not necessary to cut and process the closing member for disposing the sealing member.

The present invention includes the following embodiments:

(a) A gas generator according to the above-described invention, wherein the supporting member for supporting the flange portion of the transfer charge chamber housing is a tubular filter disposed with a gap from the inner peripheral surface of the tubular housing, and one end of the tubular filter is supported by abutting against a surface of the closed end of the tubular housing, while the other end surface of the tubular filter presses and supports the flange portion;

(b) A gas generator according to the above-described invention, wherein the supporting member for supporting the flange portion of the transfer charge chamber housing includes a combination of a tubular filter disposed with a gap from the inner peripheral surface of the tubular housing and a tubular retainer having one or two or more members, one end of the tubular filter is supported by abutting against a surface of the closed end of the tubular housing, while the other end surface of the tubular filter is supported by abutting against one end of the tubular retainer, and the other end of the tubular retainer presses and supports the flange portion;

(c) A gas generator according to the above-described invention, wherein the supporting member for supporting the flange portion of the transfer charge chamber housing includes a combination of a tubular filter disposed with a gap from the inner peripheral surface of the tubular housing and an annular step portion obtained by deforming the tubular housing, one end of the tubular filter is supported by abutting against a surface of the closed end of the tubular housing, while the other end surface of the tubular filter presses and supports the flange portion, and the step portion also presses and supports the flange portion; and (d) A gas generator according to the above-described invention, wherein the transfer charge chamber housing is press-fitted to the closing member by adjusting an outer diameter of the main body portion of the closing member and an inner diameter of the annular wall surface of the transfer charge chamber housing.

The supporting member of the present invention is for pressing the transfer charge chamber housing in the axial direction of the tubular housing to support/fix the transfer charge chamber housing.

The supporting member used in the present invention is for pressing the transfer charge chamber housing in the axial direction of the tubular housing to support/fix the transfer charge chamber housing.

An annular or tubular supporting member disposed within the tubular housing, the annular projection formed integrally with the tubular housing, and the like can be used as the supporting member used in the present invention; however, the following components (1) to (5) can preferably be used:

(1) A tubular filter for filtering/cooling the combustion gas of the gas generating agent;
(2) A tubular retainer formed of one or two or more members;
(3) An annular step portion that is obtained by deforming the tubular housing so as to project inward;
(4) A combination of the tubular filter and the tubular retainer; and
(5) A combination of the annular step portion and the tubular filter.

In the gas generator of the present invention, it is preferred that the transfer charge chamber housing be press-fitted to a first closing member by adjusting an outer diameter of the main body portion of the closing member and an inner diameter of the annular wall surface of the transfer charge chamber housing.

By so doing, in addition to supporting/fixing action of the supporting member, the fixing strengths between the closing member and the transfer charge chamber housing is enhanced. Moreover, the closing member and the transfer charge chamber housing charged with the transfer charge therein form a single unit, and thereby making it easier to store, handle and assemble.

The gas generator of the present invention is capable of not only enhancing the fixing strength and sealability of the transfer charge chamber prior to and upon the activation, but also maintaining the designed actuation performance.

Figure 2:
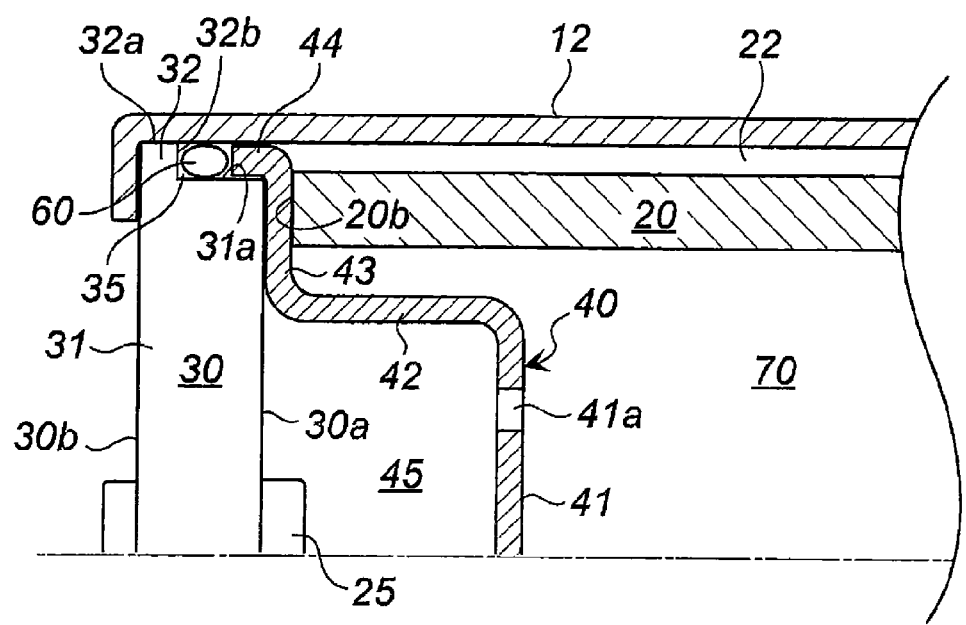
FIG. 2 shows a partial enlarged view of FIG. 1.

Embodiments of the Invention (1) Gas Generator Shown in FIGS. 1 and 2

A gas generator 10 according to an embodiment of the present invention is described with reference to FIGS. 1 and 2.

An outer shell container of the gas generator 10 is formed of a tubular housing 12 and has a plurality of discharge ports 16 formed on its peripheral wall surface. These gas discharge ports 16 are closed by a seal tape 17 from the inside.

An opening portion 13a at one end of the tubular housing 12 is closed by a disk-shaped first closing member 14, but the housing having the one end opening portion 13a closed in advance may be used.

An opening portion 13b at the other end of the tubular housing 12 is closed by a second closing member (boss) 30.

The second closing member 30 has a disk-shaped main body portion 31, and an annular projection portion 32 formed on a peripheral surface 31a of the main body portion 31. A known electric igniter 25 is attached to the second closing member 30, passing through a central part thereof.

A peripheral surface 32a of the annular projection portion 32 abuts against an inner peripheral surface of the tubular housing 12. Therefore, an annular groove 35 is formed by the peripheral surface 31a of the main body portion 31, a step portion surface 32b of the annular projection portion 32, and the inner peripheral surface of the tubular housing 12.

A transfer charge chamber housing 40 surrounding the igniter 25 is attached to the second closing member 30. The inside of the transfer charge chamber housing 40 serves as a transfer charge chamber 45 that is charged with a known transfer charge or gas generating agent.

The transfer charge chamber housing 40 is in a cup-shape, and includes a bottom surface 41, a peripheral surface 42, a flange portion 43 formed at a peripheral edge of an opening, and an annular wall surface 44 that extends in the axial direction of the tubular housing 12 from the flange portion 43. A plurality of flame-transferring holes 41a, small enough to prevent the escape of the transfer charge or gas generating agent, are formed on the bottom surface 41.

In the transfer charge chamber housing 40, the annular wall surface 44 is fitted in a part of the annular groove 35 and the flange portion 43 abuts against a surface of the main body portion 31. An O-ring 60, functioning as a sealing member, is disposed in a remaining space of the annular groove 35 for sealing. Note that an outer diameter of the annular wall surface 44 is desirably set to be slightly smaller than an inner diameter of the tubular housing 12 in order to facilitate the assembly work on the gas generator.

Inside the tubular housing 12, a tubular filter 20 is disposed so as to form a gap 22 between the tubular filter 20 and the inner peripheral surface of the tubular housing 12. The inside of the tubular filter 20 serves as a combustion chamber 70 that is charged with a gas generating agent 71.

The tubular filter 20 not only functions to cool/filter combustion gas of the gas generating agent 71, but also serves as a supporting member for supporting the flange portion 43 of the transfer charge chamber housing.

In the tubular filter 20, one end surface 20a abuts against the first closing member 14, and the other end surface 20b abuts against the flange portion 43. The tubular filter 20 is pressed in the axial direction with the first closing member 14 and the second closing member 30 by crimping an end portion 12a (i.e., bending the end portion 12a inward) and by crimping an end portion 12b, respectively. Accordingly, the tubular filter 20 serves as the supporting member, whereby the flange portion 43 is fixed by being pressed in the axial direction.

As shown in FIG. 1, an annular convex portion 15a projecting inward is formed in the vicinity of the end portion 12a of the tubular housing 12. A position of the tubular filter 20 in a radial direction is determined by the annular convex portion 15a. Additionally, if necessary, a sealing member such as an O-ring may be disposed between the first closing member 14 and the end portion 12a.

Next, an embodiment of a method for assembling the gas generator 10 shown in FIG. 1 will be described. This is one embodiment, and other assembling methods may be employed.

Figure 6:
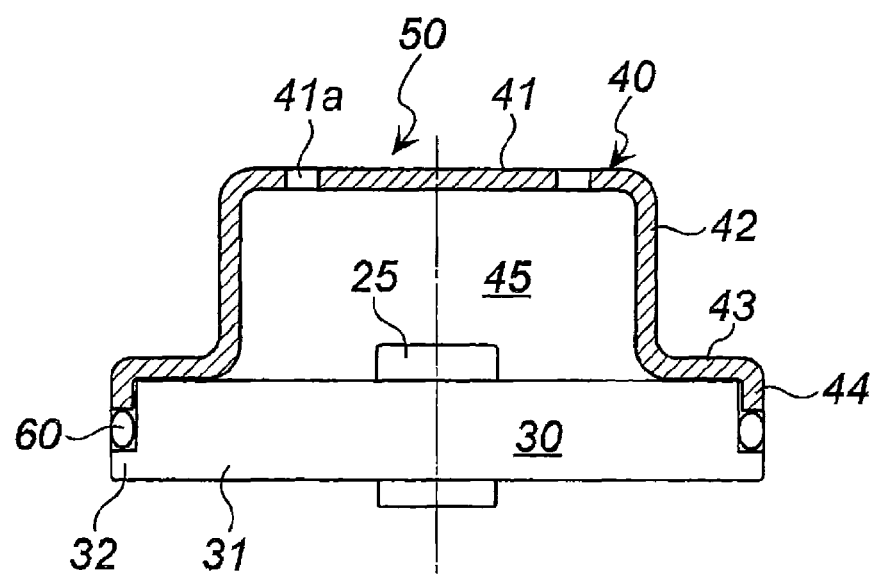
FIG. 6 shows a cross-sectional view of a transfer charge chamber unit that is used for assembling the gas generator shown in FIG. 1.

First of all, aside from an overall assembling step, the igniter 25, the second closing member 30, the O-ring 60, and the transfer charge chamber housing 40 are integrally assembled into a transfer charge chamber unit 50 shown in FIG. 6.

The igniter 25 is fixed to the second closing member 30.

Then, the O-ring 60 is fitted in from an inner side surface 30a of the second closing member 30.

Subsequently, the transfer charge chamber housing 40 is fitted to the second closing member 30 while the transfer charge chamber 45 is charged with the transfer charge, whereby the transfer charge chamber unit 50 is completed.

In so doing, an outer diameter of the main body portion 31 of the second closing member and an inner diameter of the annular wall surface 44 of the transfer charge chamber housing are adjusted in advance, and thereby the transfer charge chamber housing 40 (the annular wall surface 44) is press-fitted to the main body portion 31 (the peripheral surface 31a). By press-fitting the transfer charge chamber housing 40 to the second closing member 30 in the manner described above, the O-ring 60 can be held without being dropped.

Next, the overall assemblage is carried out using the transfer charge chamber unit 50.

First of all, the first closing member 14 is disposed at the end portion 12a of the tubular housing 12, and thereafter the end portion 12a is crimped.

Then, the tubular filter 20 is inserted and the gas generating agent 71 is charged therein.

Subsequently, the transfer charge chamber unit 50 is fitted into the end portion 12b of the tubular housing 20. In so doing, the transfer charge chamber unit 50 can be fitted in easily, by previously setting the outer diameter of the annular wall surface 44 to be slightly smaller than the inner diameter of the tubular housing 12.

The end portion 12b is then crimped to fix the transfer charge chamber unit 50 in the axial direction. Through this step, the pressing operation by the tubular filter 20 serving as the supporting member causes the annular wall surface 44 of the transfer charge chamber housing 40 to press the O-ring 60, and consequently the flange portion 43 is brought into press-contact with the inner side surface 30a.

Note that the igniter 25 may be attached to the second closing member 30 after the step described above. In this case, the transfer charge chamber unit 50 shown in FIG. 6 does not include the igniter 25, and a hole for attaching the igniter 25 is closed by seal tape or the like from an outer side surface 30b.

Operations of the gas generator shown in FIGS. 1 and 2 will be described.

The transfer charge inside the transfer charge chamber 45 is burnt by activation of the igniter 25. At this moment, combustion products (high-temperature gas or flames) pass through the flame-transferring holes 41a and ignite the gas generating agent 71 of the combustion chamber 70.

In the transfer charge chamber 45, pressure (impact) is applied mainly to the bottom surface 41 of the transfer charge chamber housing 40 due to the pressure or impact generated by the combustion of the transfer charge. The bottom surface 41 deforms by this pressure so as to project in the axial direction (the direction to the combustion chamber 70). Consequently, the flange portion 43 is also pulled in the axial direction. As a result, the annular wall surface 44 deforms so as to be pressed inward in the radial direction. This deformation hardly occurs when the annular wall surface 44 is press-fitted to the main body portion 31; however, if the annular wall surface 44 ever deforms, it deforms in the manner described above. Therefore, the adhesion of the contact surface between the peripheral surface 31a of the main body portion and the annular wall surface 44 is improved.

Consequently, the combustion products that are generated in the transfer charge chamber 45 are entirely discharged to the combustion chamber 70 through the flame-transferring holes 41a without short-passing, and then used for igniting/burning the gas generating agent 71.

The combustion gas that is generated as a result of the combustion of the gas generating agent 71 is cooled/purified while passing through the filter 20, flows to the gap 22, breaks the seal tape 17, and is discharged from the gas discharge ports 16.

Figure 3:
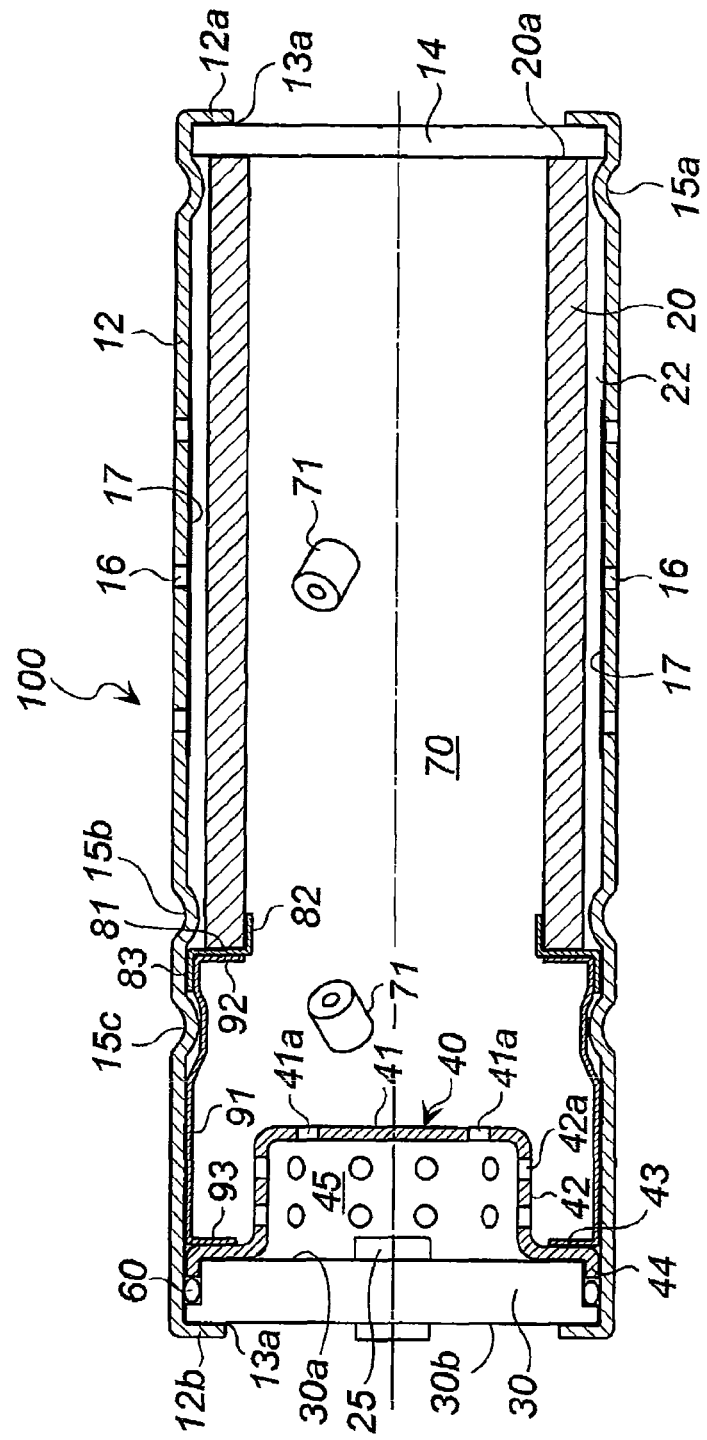
FIG. 3 shows an axial sectional view of a gas generator according to another embodiment of the present invention.
Figure 4:
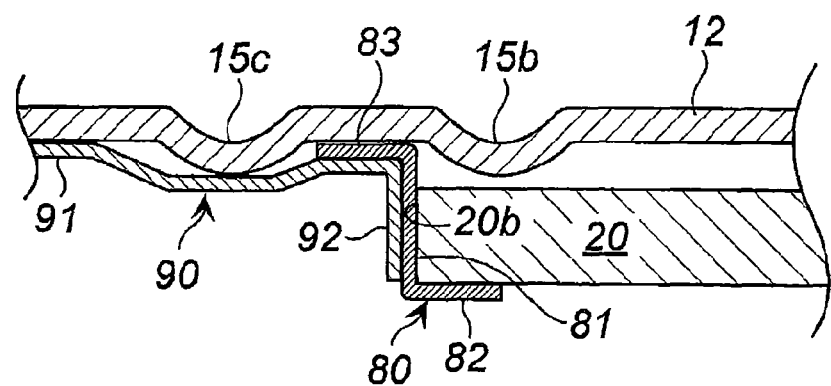
FIG. 4 shows a partial enlarged view of FIG. 3.

(2) Gas Generator Shown in FIGS. 3 and 4

A gas generator 100 according to another embodiment is described with reference to FIGS. 3 and 4. The gas generator 100 shown in FIG. 3 is same as the gas generator 10 shown in FIG. 1, except for a combination of a tubular filter and a tubular retainer including one or two or more members for fixing the second closing member 30. The transfer charge chamber unit 50 shown in FIG. 6 can be used during assembling.

The one end surface 20a of the tubular filter 20 abuts against the first closing member 14, and the other end surface 20b is supported by a supporting member that includes a combination of a retainer (or a first retainer) 80 and a spacer (or a second retainer) 90. Note that the retainer 80 and the spacer 90 may be formed into a single tubular retainer.

The retainer 80 includes an annular plane surface 81, an annular inner peripheral surface 82 that extends in the axial direction of the tubular housing 12 from an inner peripheral edge of the annular plane surface 81, and an annular outer peripheral surface 83 that extends, from an outer peripheral edge of the annular plane surface 81, in an opposite direction of the annular inner peripheral surface 82.

In the retainer 80, the annular plane surface 81 abuts against the end surface 20b of the filter 20 and the annular inner peripheral surface 82 abuts against the inner peripheral surface of the tubular filter 20.

The spacer 90 includes a peripheral wall portion 91, a first annular plane surface 92 formed on one end (in the tubular filter 20 side) of the peripheral wall portion 91, and a second annular plane surface 93 formed on the other end (in the second closing member 30 side) of the peripheral wall portion 91.

The peripheral wall portion 91 abuts against the inner peripheral surface of the tubular housing 12 and against the annular outer peripheral surface 83. The first annular plane surface 92 abuts against the annular plane surface 81. The second annular plane surface 93 abuts against the flange portion 43.

In the tubular housing 12, two annular convex portions 15b, 15c, projecting inward, are formed at intervals in the axial direction. The annular outer peripheral surface 83 of the retainer 80 is placed between the two annular convex portions 15b, 15c. As a result, a position of the retainer 80 and a position of the spacer 90 combined therewith are determined. Note that the peripheral wall portion 91 of the spacer facing the annular convex portion 15c is depressed inward, as shown in the drawing.

In the gas generator 100 shown in FIG. 3, combination of the three members, i.e., the tubular filter 20, the retainer 80 and the spacer 90, functions as a supporting member of the transfer charge chamber housing 40 in the same way as the tubular filter 20 shown in FIG. 1.

Compared to the gas generator 10 shown in FIG. 1, the gas generator 100 shown in FIG. 3 has more parts because of the combination of the three members as the supporting member, but has such an advantage that a wider space is provided outside the peripheral surface 42 of the transfer charge chamber housing 40 (the volume of the combustion chamber 70 is increased). Consequently, the amount of gas generating agent 71 can be increased. From the perspective of enhancing the ignition performance of the increased gas generating agent 71, the flame-transferring holes 42a for discharging the combustion products are formed also on the peripheral surface 42 of the transfer charge chamber housing 40 in the gas generator 100 shown in FIG. 3.

Figure 5:
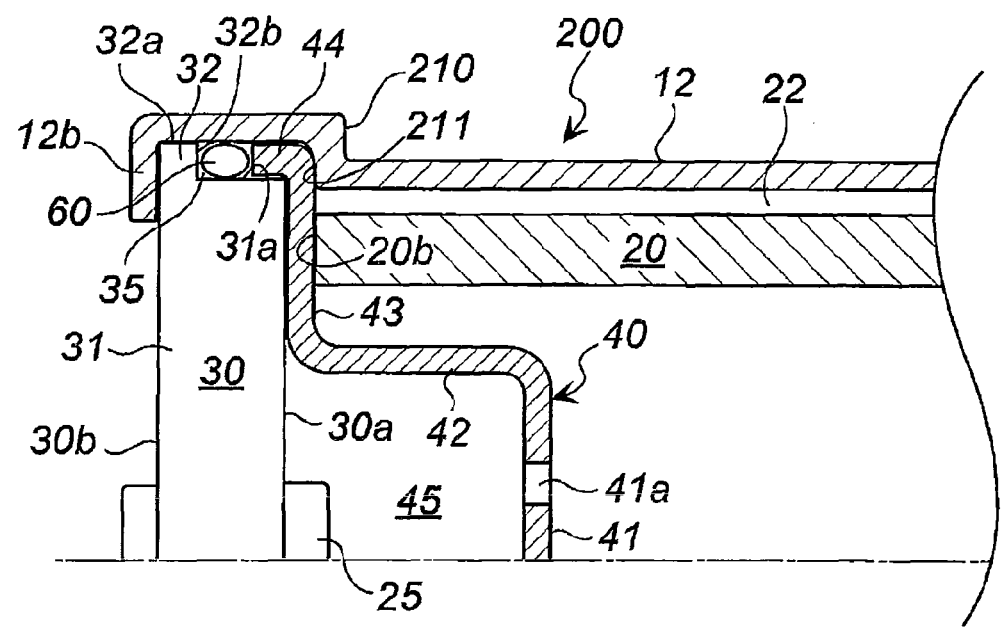
FIG. 5 shows an axial partial sectional view of a gas generator according to yet another embodiment of the present invention.

(3) Gas Generator Shown in FIG. 5

A gas generator 200 according to yet another embodiment will be described with reference to FIG. 5. The gas generator 200 shown in FIG. 5 is same as the gas generator 10 shown in FIG. 1, except for the step portion formed in the tubular housing 12, for fixing the second closing member 30. The transfer charge chamber unit 50 shown in FIG. 6 can be used during assembling.

The gas generator 200 uses a combination of the tubular filter 20 and an annular step portion 210 obtained by deforming the tubular housing 12, as the supporting member for supporting the flange portion 43 of the transfer charge chamber housing 40.

The step portion 210 is formed by partially enlarging the outer diameter of a part in the vicinity of the end portion 12b of the tubular housing 12. The flange portion 43 is pressed and supported by an inner side surface 211 of this annular step portion 210.

Even if the gas generator 200 shown in FIG. 5 does not use the tubular filter 20, for example in use of a gas generating agent to be combusted at low combustion temperatures, the flange portion 43 is fixed and supported by the annular step portion 210 without problems, Any of the gas generators shown in FIGS. 1 to 5 is suitable as a gas generator that is used in an airbag system in a passenger-side next to a driver.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A gas generator, comprising:
a cylindrical housing having both ends closed, a gas discharge port in a peripheral surface thereof and a combustion chamber charged with a gas generating agent therein;
a closing member closing one of the closed ends of the cylindrical housing and including a disk-shaped main body portion, an annular projection portion formed in a peripheral surface at one side of the main body portion, and a peripheral surface of the annular projection portion abutting against an inner peripheral surface of the cylindrical housing,
an igniter attached to the closing member; and
a transfer charge chamber housing defining a transfer charge chamber charged with a transfer charge, and attached to the closing member so as to surround the igniter,
the transfer charge chamber housing having a cup-like shape including a peripheral surface, a bottom surface formed with a flame-transferring hole, a flange portion formed at an opening portion thereof, and an annular wall surface extending in an axial direction of the cylindrical housing from the flange portion,
the transfer charge chamber housing being mounted such that the annular wall surface thereof is fitted into a part of an annular groove defined by the cylindrical housing, the main body portion and the annular projection portion of the closing member, and the flange portion abuts against a surface of the main body portion that faces the transfer charge chamber,
the transfer charge chamber housing being fixed to the closing member by the flange portion pressed in the axial direction by a supporting member provided inside the cylindrical housing; and a sealing member being disposed in a remaining space of the annular groove and sealing between the cylindrical housing and the closing member, such that an end of the annular wall surface of the transfer charge chamber housing extends parallel to the cylindrical housing and directly opposes the sealing member.

2. A gas generator according to claim 1, wherein the supporting member for supporting the flange portion of the transfer charge chamber housing is a tubular filter disposed with a gap from the inner peripheral surface of the tubular housing, and one end of the tubular filter is supported by abutting against a surface of the other of the closed ends of the tubular housing, while the other end surface of the tubular filter presses and supports the flange portion.

3. A gas generator according to claim 1, wherein the supporting member for supporting the flange portion of the transfer charge chamber housing includes a combination of a tubular filter disposed with a gap from the inner peripheral surface of the tubular housing and a tubular retainer having one or two or more members, one end of the tubular filter is supported by abutting against a surface of one of the closed ends of the tubular housing, while the other end surface of the tubular filter is supported by abutting against one end of the tubular retainer, and the other end of the tubular retainer presses and supports the flange portion.

4. A gas generator according to claim 1, wherein the supporting member for supporting the flange portion of the transfer charge chamber housing includes a combination of a tubular filter disposed with a gap from the inner peripheral surface of the tubular housing and an annular step portion obtained by deforming the tubular housing, one end of the tubular filter is supported by abutting against a surface of the one of the closed ends of the tubular housing, while the other end surface of the tubular filter presses and supports the flange portion, and the step portion also presses and supports the flange portion.

5. A gas generator according to claim 1, wherein the transfer charge chamber housing is press-fitted to the closing member by adjusting an outer diameter of the main body portion of the closing member and an inner diameter of the annular wall surface of the transfer charge chamber housing.

6. A gas generator according to claim 1, wherein the igniter, the closing member, the sealing member, and the transfer charge housing are integrally assembled into a transfer charge chamber unit.

7. A gas generator according to claim 1, wherein an outer diameter of the annular wall surface deforms inward in a radial direction to press an outer peripheral surface of the main body portion by deforming the bottom surface in an axial direction toward the combustion chamber.

8. A gas generator according to claim 1, wherein, upon activation of the gas generator, the transfer charge chamber housing deforms due to the bottom surface of the transfer charge chamber housing deforming in the axial direction toward the combustion chamber, which deforms the annular wall surface inward in a radial direction to press an outer peripheral surface of the main body portion.

9. A gas generator according to claim 3, wherein the tubular retainer includes, a retainer provided with an annular plane surface, an annular inner peripheral surface that extends in an axial direction of the cylindrical housing from an inner peripheral edge of the annular plane surface, and an annular outer peripheral surface that extends from an outer peripheral edge of the annular plane surface in an opposite direction of the annular inner peripheral surface, and a spacer provided with a peripheral wall portion, a first annular plane surface formed on one end of the peripheral wall surface portion, and a second annular plane surface formed on the other end of the peripheral wall portion.

10. A gas generator according to claim 9, further comprising:

a tubular filter provided within the combustion chamber such that the annular plane surface of the retainer abuts against an end surface of the tubular filter and the annular inner peripheral surface of the retainer abuts against an inner peripheral surface of the tubular filter.

11. A gas generator according to claim 9, wherein the peripheral wall portion of the spacer abuts against the inner peripheral surface of the cylindrical housing and against the annular outer peripheral surface of the retainer, and wherein the first annular plane surface abuts against the annular plane surface of the retainer and the second annular plane surface abuts against the flange portion of the transfer charge chamber housing.

12. A gas generator according to claim 9, wherein the cylindrical housing includes two convex portions that project inward and formed at intervals in an axial direction, and wherein the annular outer peripheral surface of the retainer is placed between two convex portions.

13. A gas generator according to claim 12, wherein the peripheral wall portion of the spacer facing one of the two convex portions is depressed inward.

* * * * *